UNITED STATES PATENT OFFICE.

CAROLINE S. ELY, OF CHAMPLAIN, NEW YORK, ADMINISTRATRIX OF CHARLES R. ELY, DECEASED.

WASHING COMPOUND.

SPECIFICATION forming part of Letters Patent No. 493,693, dated March 21, 1893.

Application filed December 31, 1892. Serial No. 456,942. (No specimens.)

*To all whom it may concern:*

Be it known that CHARLES R. ELY, formerly a citizen of the United States, and formerly residing in the town of Champlain, in the county of Clinton, in the State of New York, now deceased, did invent during his life-time a new and useful composition of matter to be used in washing clothes and fabrics, and for cleaning floors, woodwork, and other like work requiring a washing or cleansing compound, of which the following is a specification.

Said composition consists of the following ingredients, combined in the proportions stated, viz.:

| | |
|---|---|
| Seventy-six parts soda ash | 76 |
| Six and one-quarter parts sulphate of ammonia | 6¼ |
| Two parts borax | 2 |
| Six and one-quarter parts oat flour | 6¼ |
| Nine and one-half parts wheat flour | 9½ |
| Making in all one hundred parts | 100 |

It is important that the several parts be thoroughly mixed, in order that the different parts when assimilated shall form one compound as thoroughly homogeneous as possible, and my system of mixing, which has proved entirely satisfactory, is, after the different ingredients have been carefully weighed out for any predetermined quantity in the proportions as above named, a small portion of each of the ingredients is thrown in a vessel convenient to the work until the whole quantity is thrown in. The compound is then stirred together, and all ground very fine, and then placed in a tightly closed tumbling barrel, and revolved until the compound is perfectly mixed, when the compound is ready for use. The exact proportion of these ingredients is found to produce good results, yet the amounts may be varied somewhat; for instance, the amount of borax may be increased, and the soda ash diminished, without detriment.

It is not wished to be confined to the use of oat or wheat flours, as other farinaceous flours will produce similar results. Experience has shown, however, that oat and wheat flours are preferable.

What is claimed, and desired to be secured by Letters Patent of the United States, is—

The herein described washing compound, consisting of soda ash, sulphate of ammonia, borax, oat flour and wheat flour, substantially in the proportions specified.

CAROLINE S. ELY,
*Administratrix of estate of Charles R. Ely, deceased.*

Witnesses:
 B. W. BOWRON,
 MILLIE LA FOUNTAIN.